Aug. 24, 1965 C. A. WHITNEY 3,202,982

CODE CONVERSION APPARATUS

Filed July 12, 1960 7 Sheets-Sheet 1

INVENTOR
CHARLES A. WHITNEY
BY Thomas S. Ross
Joseph R. Spalla
ATTORNEYS

Aug. 24, 1965 C. A. WHITNEY 3,202,982

CODE CONVERSION APPARATUS

Filed July 12, 1960 7 Sheets-Sheet 2

INVENTOR
CHARLES A. WHITNEY

BY Thomas S. Ross
Joseph R. Spalla
ATTORNEYS

CODE CONVERSION APPARATUS

Filed July 12, 1960

7 Sheets-Sheet 3

INVENTOR
CHARLES A. WHITNEY

BY Thomas S. Ross
Joseph R. Spalla
ATTORNEYS

Aug. 24, 1965 C. A. WHITNEY 3,202,982

CODE CONVERSION APPARATUS

Filed July 12, 1960 7 Sheets-Sheet 4

INVENTOR
CHARLES A. WHITNEY
BY Thomas S. Ross
Joseph P. Spalla
ATTORNEYS

Aug. 24, 1965

C. A. WHITNEY 3,202,982

CODE CONVERSION APPARATUS

Filed July 12, 1960

7 Sheets-Sheet 5

INVENTOR
CHARLES A. WHITNEY

Thomas S. Ross
Joseph R. Spalla
ATTORNEYS

Aug. 24, 1965 C. A. WHITNEY 3,202,982

CODE CONVERSION APPARATUS

Filed July 12, 1960 7 Sheets-Sheet 6

INVENTOR
CHARLES A. WHITNEY

Thomas S. Ross
Joseph R. Spalla
ATTORNEYS

INVENTOR
CHARLES A. WHITNEY
BY Thomas S. Ross
Joseph R. Spalla
ATTORNEYS 3,202,982
Patented Aug. 24, 1965

3,202,982

CODE CONVERSION APPARATUS

Charles A. Whitney, Canton, Conn., assignor to Royal McBee Corporation, Port Chester, N.Y., a corporation of New York Filed July 12, 1960, Ser. No. 42,324
7 Claims. (Cl. 340—347)

This invention relates to code conversion apparatus; more particularly it relates to apparatus for converting bit parallel codes having 5 information levels to represent information into corresponding parallel bit codes having 6 information levels and vice versa.

The number of items of information that can be represented by a 5 or 6 level or bit code may be increased by employing two of the possible combinations of the code as precedence designators. These precedence designators or codes which are designated "Letters" and "Figures" or lower case and upper case shift codes are generated in response to the shifting of the type basket or printing point on a business machine and are operative to control machine instrumentalities to shift the basket or printing point when the machine is being automatically operated.

The items of information, i.e. characters plus functions, associated with a telecommunications system machine can be represented by the combinations possible with a 5 bit code using precedence. The items of information associated with a data processing system machine is however greater than can be accommodated by a 5 level code thus necessitating the use of a 6 level code with precedence designators. The difference between the machines employed in telecommunications systems and the larger capacity machines employed in data processing systems results not only in different code assignments for identical characters but also to noncorrespondence of upper case and lower case character assignments in the systems, i.e. a character which is assigned to upper case in the system employing a 5 level code may be assigned either to upper or lower case in the system employing a 6 level code.

5 to 6 level code conversion may be effected by translation and re-encoding when all of the characters of a system employing a 5 level code are lower case characters in a system employing a 6 level code. When, however, an upper case character in the system employing a 5 level code is also an upper case character in the system employing the 6 level code, provision must be made for inserting automatically a 6 level "Figures" precedance code before conversion of the character and a "Letters" precedence code before conversion of a subsequent character which is lower case in the system employing the 6 level code. Similarly 6–5 level code conversion requires the insertion of "Figures" precedence codes before conversion of characters which are upper case in a system employing the 5 level code and "Letters" precedence codes before conversion of subsequent characters which are lower case in the system employing the 5 level code. Further there has not been any standardization of system character code assignments; and each system is likely to assign a different code representation to one particular character. Reconciling these idiosynchrocies apparatuswise has not been accomplished insofar as is known in a simple inexpensive manner.

The present invention has particular utility in association with perforated tape reading and perforating apparatus wherein 5 level codes read from a perforated tape are regenerated by a perforating unit into 6 level codes and vice versa. It is to be understood however that the invention is not limited to perforate tapes but is equally applicable to other types of record storage media.

The conversion of 5 to 6 level codes is effected by translating 5 level codes successively sensed from a record which is incrementally moved by record feeding apparatus. The translation of the five level codes is effected in a matrix translator having a "Figures" and "Letters" half. Switching between the "Figures" half of the translator to the "Letters" half is effected by signals resulting from the translation of 5 level "Figures" and "Letters" precedence codes. Hence, if all of the characters represented by the 5 level codes (upper and lower case) are lower case characters in the system employing the 6 level code, the translator outputs may be "steered" to inputs of a 6 level encoder which are representative of the decoded characters in the system employing the 6 level code. If however upper case characters in the system employing the 5 level codes are also upper case characters in the system employing the 6 level code, the translator outputs representative of such characters are not only directed to the proper inputs of the 6 level encoder but in addition are directed to a bistable precedence code generator circuit. This circuit when it switches from one to the other of its stable states inhibits the 5 level record feed apparatus, generates a null code signal at the input of the encoder whereby the resulting null overrides the character code, and inhibits selected bits in the null code to produce a 6 level "Figures" shift code. Thereafter the code which caused the generation of the "Figures" code is sensed again, translated, and encoded. The record is moved, and subsequent codes are sensed, translated and encoded into 6 level codes. The precedence code generator circuit remains in its other state until a code representing a lower case character in the system employing the 6 level code is translated at which time it switches back to its initial state and operates in the same fashion to generate a 6 level "Letters" shift code prior to the generation of the character code which initiated the generation of the "Letters" code. 6 to 5 level conversion differs in the employment of a 6 level translator and a 5 level encoder. The precedence code generating circuit in the 6 to 5 circuit functions as in the 5–6 application.

An object of the invention therefore is to provide apparatus for converting 5 level codes to 6 level codes and vice versa.

Another object of the invention is in the provision of an apparatus for converting 5 level codes directly into 6 level codes where the characters represented by the 5 level codes are lower case characters in the system employing the 6 level codes and vice versa.

Another object of the invention is in the provision of an apparatus for converting 5 level codes representative of first system information into 6 level codes representing corresponding second system information and vice versa including circuitry for automatically generating second system precedence codes when the second system case assignment of the information represented by the code last converted differs from the second system case assignment of the information represented by the code to be converted, prior to conversion of the code.

Another object is to provide in an apparatus for converting $n$ to $m$ level codes employed by first and second systems and representative of information whose case assignments differ from system to system, circuitry for generating a null code in response to an $n$ level code representative of a character whose second system assignment differs from the second system case assignment of the character whose code was last converted, and for inhibiting selected bits of the null code thereby to generate "Figures" and "Letters" precedence codes prior to conversion of the $n$ level code.

A further object of the invention is in the provision of $n$ to $m$ level code conversion apparatus with provision for generating $m$ level precedence codes and with provision for delaying conversion of codes responsible for the generation of a precedence code over the interval of generation of precedence codes.

Other objects and many of the attendant advantages of this invention will be readily appreciated as the same becomes better understood by reference to the following detailed description when considered in connection with the accompanying drawings in which like reference numerals designate like parts throughout the figures thereof and wherein.

As noted hereinbefore the converter of the invention is provided with inputs to accept first system codes to be converted and with outputs to deliver second system codes to a recorder and includes novel circuit means operative in response to predetermined codes to generate second system precedence codes and also to generate a signal thereby to direct the source of first system codes to hold the code responsible for the generation of the precedence code whereby subsequent to the generation of the precedence code the same input first system code will again be presented for conversion. Accordingly any source of input codes and any recorder of output codes may be employed with the converter; the recorder as is conventional controlling the issuance of codes from the source. As described herein the converter is preferably employed with a cyclically operable reader and punch mechanism to more expeditiously regenerate records; the punch mechanism initiating the operation of the reader except when the latter is inhibited by the converter.

More particularly a 5 or 6 level code tape is fed through a reader mechanism wherein the columnar perforate codes are sensed column by column under control of perforating mechanism, translated and re-encoded as will hereinafter appear and punched column by column in a 6 or 5 level code tape by a synchronously operated perforating mechanism. The perforating and reading mechanism, which per se are not part of the present invention are fully disclosed in copending application Serial No. 780,090, filed December 12, 1958. In order to better understand the present invention however these mechanisms will be briefly described.

Figure 2:
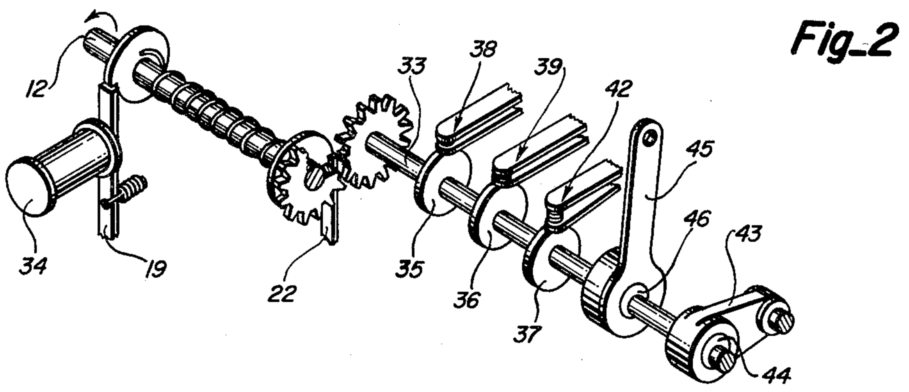
FIGURE 2 is a perspective view of the punch clutch and punch cam shaft.
Figure 1:
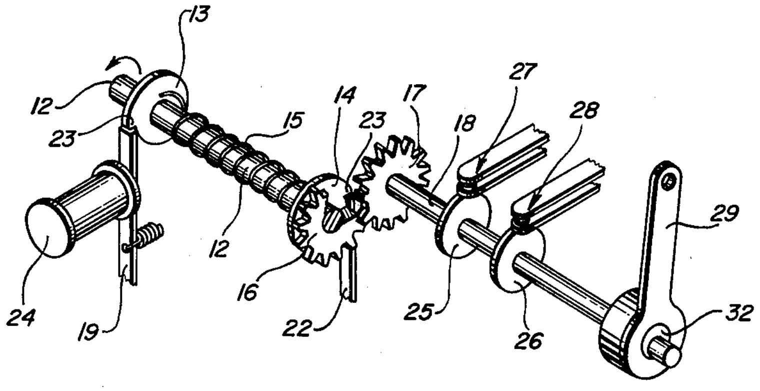
FIGURE 1 is a perspective view of the reader clutch and reader cam shaft.

Referring therefore to the drawings wherein like reference characters designate like or corresponding parts throughout the several views thereof there is shown in FIGURES 1 and 2 a source for powering the perforating and reading mechanisms comprising a continuously driven main shaft 12. On this shaft as shown in FIGURE 1 are rotatably mounted a pair of reader clutch control discs 13 and 14 interconnected by a wrap spring 15 whose wind is in the same direction of rotation of shaft 12. Secured by suitable means to disc 14 is an output gear 16 adapted to drive a gear 17 secured on a reader cam shaft 18. The spring 15 has a diametral dimension such that when mounted on shaft 12 it is radially expanded to a slight extent thereby to grip shaft 12; rotation of the main shaft serving to tighten the grip of the spring. In this condition shaft 12 will drive the gear 16. Spring 15 is normally retained in a disengaged condition by relatively rotatably displacing the clutch control discs 13 and 14 in opposite directions so as to unwind the spring 15 whereby it radially expands out of engagement with shaft 12. The discs are held so as to maintain the spring disengaged by a clutch latching armature 19 and a latch member 22 each of which cooperate with a shoulder 23 on its associated discs to prevent rotation of the discs. In order to engage the spring the clutch latching armature 19 is pulled out of engagement with disc 13 upon energization of a clutch solenoid 24, permitting the spring 15 to radially contract and thereby couple shaft 12 and gear 16. Discs 13 and 14 will also rotate while the clutch is engaged; latch member 22 idly ratcheting over the shoulder 23 of disc 14. Disengagement occurs upon de-energization of solenoid 24 whereby armature 19 moves into the path of the shoulder 23 on disc 13 thereby to arrest rotation of the disc 13 and the end of spring 15 attached thereto. The rotational inertia of the driven parts will cause the disc 14 to continue rotation for a short period of time after de-energization of solenoid 24 thereby to cause the other end of spring 15 attached to disc 14 to rotate relative to the end attached to disc 13. This relative rotation will cause the spring 15 to unwrap and be decoupled from shaft 12; latch members 19 and 22 maintaining it unwrapped until re-energization of solenoid 24.

Mounted on the reader cam shaft is a clutch solenoid release cam 25 and a reader feed solenoid release cam 26 which are operative on breaker contacts 27 and 28 respectively to break and make the circuits for these solenoids at predetermined times as will hereinafter appear. The reader cam shaft also carries a reader feed drive arm 29 rotatively mounted on an eccentric portion 32 of cam shaft 18 whereby it partakes of a cyclic up down motion each rotation of the cam shaft.

A punch cam shaft 33 (FIGURE 2) is similarly cycled upon energization of a punch clutch control solenoid 34. The punch cam shaft carries a punch clutch solenoid release cam 35, a feed solenoid release cam 36, and a regen cam 37 which are operative on breaker contacts 38, 39 and 42 respectively to break and make the circuits for the solenoids and to sense the record being converted at predetermined times in a cycle as will hereinafter appear. The punch cam shaft 33 also carries a punch drive arm 43 rotatably mounted on an eccentric portion 44 of shaft 33 and a punch feed drive arm 45 rotatably mounted on an eccentric portion 46 of cam shaft 33. The eccentrics are shaped to drive the punch drive arm 43 in a right left direction and the feed arm 45 in an up down motion.

Figure 3:
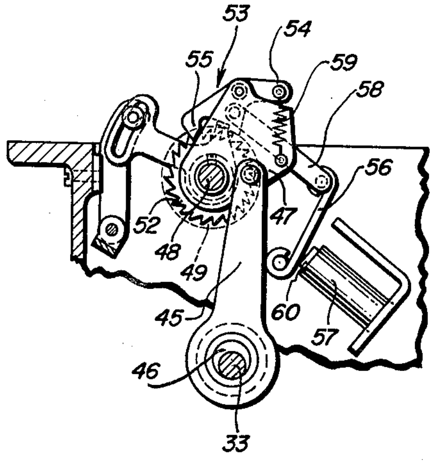
FIGURE 3 is an elevational view of a tape feed mechanism.

In that the reader and punch feed mechanisms are identical an explanation of one will suffice for both. FIGURE 3 shows the 180° position of the elements of the punch feed mechanism which is the 0° position of the elements of the reader feed mechanism. As shown the punch feed drive arm 45 is pivotally connected at its upper end to an actuator 47 which is pivotally connected on the shaft 48 of a feed drum 49. Secured to shaft 48 is a ratchet wheel 52. The ratchet wheel is adapted to be engaged and driven by a pawl 53 rotatably mounted intermediate its tail and toothed ends 54 and 55, respectively, to the actuator 47 and is coupled to the end of an armature 56 associated with a feed solenoid 57 by a link 58. A pawl biasing spring 59 is connected between the tail end of the pawl and the actuator. The operation of the punch feed mechanism is as follows: With the punch cam shaft 33 at rest the drive arm 45 is in its down position, the armature 56 is adjacent the solenoid pole piece 60, and the toothed ratchet engaging end 55 of the pawl 53 is biased out of engagement with the ratchet wheel. Rotation of cam shaft 33 will cause the drive arm 45 to go through an up-down cycle; the up position corresponding to 180° rotation of shaft 33. The upward movement of the drive arm 45 rotates the actuator 47 counterclockwise. Since the pawl 53 rotatably mounted on the actuator 47 is linked to the armature 56, which will be restrained if the solenoid 57 is energized, it will rotate relative to the actuator 47 and when the drive arm 45 reaches a position corresponding to a predetermined angular rotation of shaft (42° in the embodiment described) it will engage the ratchet wheel 52. Continued rotation of shaft 33 to 180° (the position shown) will rotate the actuator further counterclockwise whereby the pawl will lock with and move the ratchet wheel 52 one tooth thereby advancing the feed drum 49 one increment. The reader feed is similar except that feed occurs in the 222°–360° interval; the reader feed armature being adjacent the solenoid pole piece at 180° as will hereinafter appear.

Figure 4:
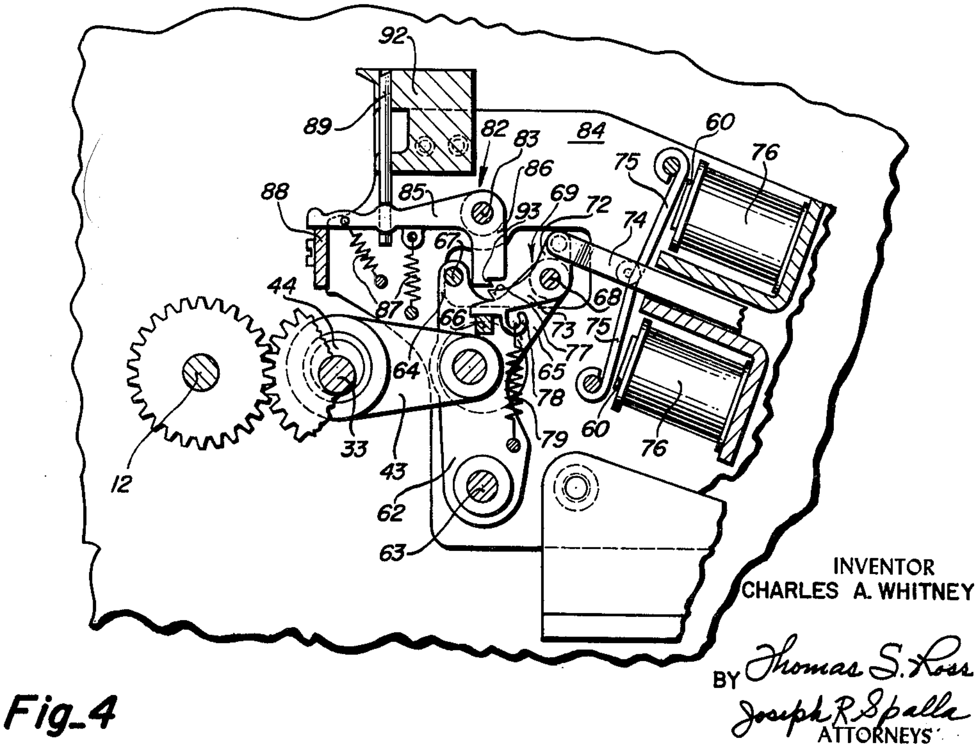
FIGURE 4 is an elevational view of the tape punch mechanism.

The punching mechanism is shown in FIGURE 4 wherein the punch drive arm 43 is rotatably connected to a pair of horizontally spaced Y-shaped actuators 62 (only one of which is shown) which are rotatably mounted at their lower ends on a shaft 63. The upper portions of the actuator arms are bifurcated thereby forming angularly disposed branches 64 and 65 respectively. The actuator arms mount between them a collared pawl stop bar 66, a bell crank limit bar 67 connected to and between the rearwardly disposed branches 64 of the actuator arms, and a pawl carrier bar 68 connected to and between the forwardly disposed branches 65 of the actuator arms. A plurality of pawls 69 having upper and lower arms 72 and 73 respectively, are rotatably mounted on the pawl carrier bar 68. The upper arms 72 of the pawls are rotatably connected to the ends of links 74, whose other ends are rotatably connected to the free ends of armatures 75 associated with bit punch selector solenoids 76 and a feed hole punch solenoid. The upper edges of the lower arms of the pawls are each provided with detents 77 and the lower edges thereof are each provided with an ear 78. Pawl return springs 79 are connected between the ears on the pawls and to a spaced anchor rod secured to and extending between the spaced actuator arms.

A plurality of bell cranks 82 are rotatably mounted on a fulcrum bar 83 extending between two spaced vertical mounting plates 84. Each of the bell cranks has a laterally extending arm 85 and a downwardly extending arm 86. Bell crank return springs 87 are connected to holes and ears formed on alternate bell cranks respectively and to spring anchor rods secured to and between the horizontally spaced vertical mounting plates. A bar 88 secured between the mounting plates serves to limit the counterclockwise rotation of the bell cranks. Cylindrical punches 89 provided with undercut portions are mounted on each of the laterally extending arms 85 of the bell cranks, with the punches vertically disposed in and guided by aligned holes in a guide block 92 secured between mounting plates 84. Included in the aligned array of punches is an index or feed punch whereby, as is understood in the art, a tape passing between the guide block and a die block (not shown) will be perforated with coded data and feed holes. The downwardly extending arms of the bell cranks are each provided on their lower edges with a detent 93 complimentary to the detents 77 in the pawls. The downwardly depending bell crank arms are normally biased against the bar 88 by the bell crank return springs. The pawls are also biased away from the bell cranks in a counterclockwise direction by the pawl return springs; the pawl stop bar 66 secured to and between the spaced actuator arms serving to limit the counterclockwise movement thereof. As is apparent with the pawls 69 so biased, the armatures 75 of the solenoids 76 are held biased away from their associated pole pieces 60 because of the links connected between pawls and armatures.

The punch operation is as follows:

As the punch drive arm 43 goes through a motion corresponding to 90° rotation of cam shaft 33 it causes the actuator arms 62 to rock clockwise. The pawls 69 rotatably mounted on the pawl carrier bar 68 carried by the actuator arms move therewith thereby causing the armatures 75, through connecting links 74, to reduce the air gaps between armatures and solenoid pole pieces 60. When the actuator arms 62 reach a position corresponding to 90° rotation of cam shaft 33, or zero air gap position, the currents in the punch selector solenoids 76, which were selectively energized earlier as will hereinafter appear, exert proper restraining force on their associated armatures. Hence, as the actuator arms 62 move in a counterclockwise direction toward a position corresponding to 180° shaft rotation the energized ones of the solenoids 76 and the feed punch selector solenoid restrain their respective armatures 75. The pawls 69 connected to selectively restrained armatures through associated links 74 are caused to pivot at the point of connection to the links, and since the pawls 69 are rotatably mounted on the pawl carrier bar 68 connected across the actuator arms 62, the counterclockwise movement of the arms 62 causes the pawls to rotate relative to the actuator arms until the detents 77 thereon engage the complementary detents 93 in associated bell cranks 82. Further movement of the actuator arms 62 in a counterclockwise direction causes the pawls to lock with associated bell cranks. When this occurs the selected punches are coupled to the actuator arms. Further motion rotates the bell cranks 82 clockwise and causes associated punches 89 to rise and perforate a tape in their path over an interval corresponding to rotation of cam shaft 33 between 187° and 353° as will hereinafter appear.

Figure 8:
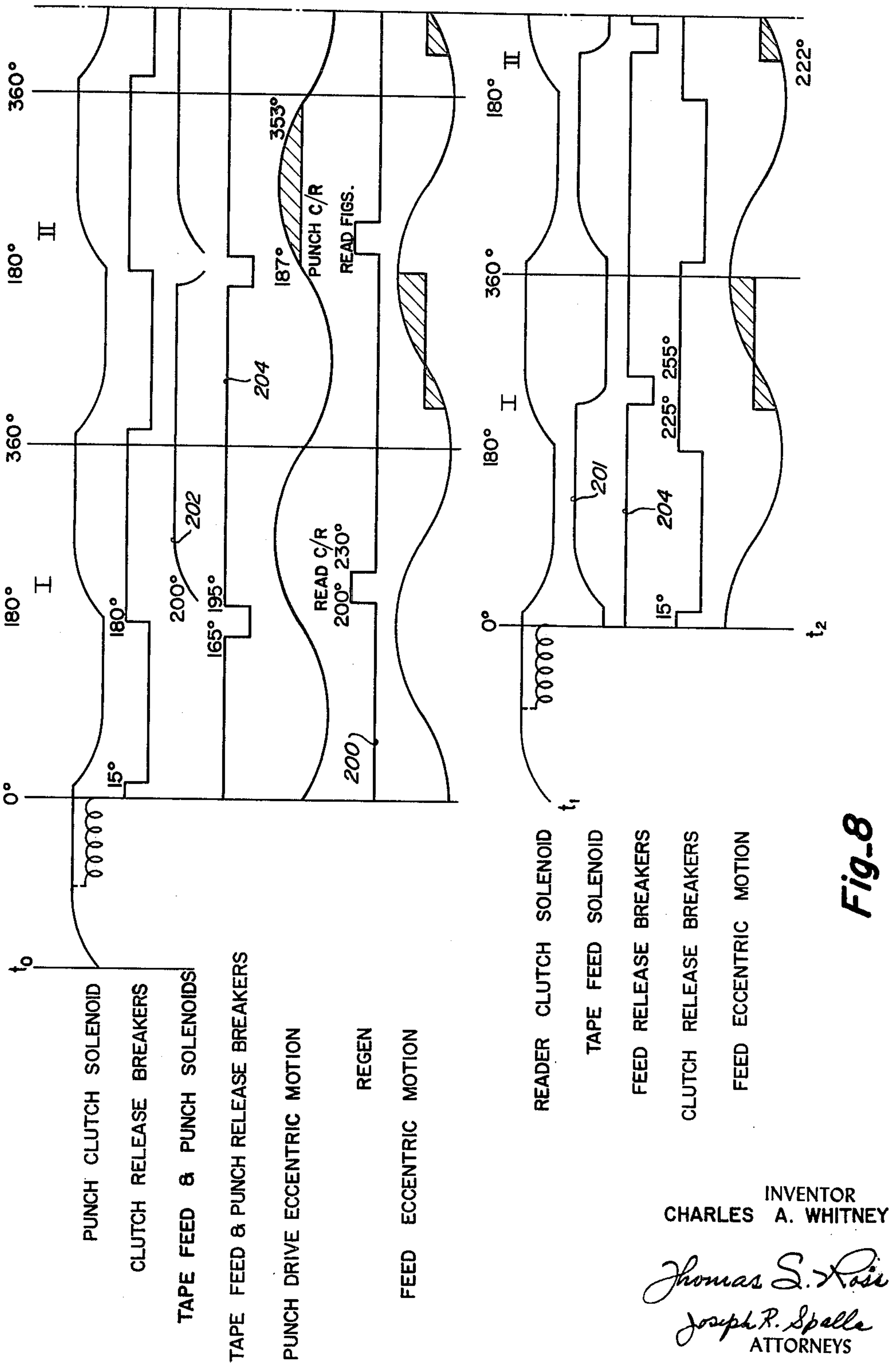
FIGURES 8 and 9 are timing diagrams explanatory of the system operation.

As is apparent after the pawls 69 lock with associated bell cranks 82 there can be no further relative movement between the actuator arms 62 and pawls 69 so that while the punches 89 are rising to complete punching the armatures 75 associated with energized solenoids 76 are forcibly drawn away from their pole pieces thereby re-establishing air gaps, after which, when the punch drive arm 43 is in a position corresponding to 165° of cam shaft rotation the feed and punch selector solenoids are de-energized by the opening of release breakers 39. At a time corresponding to 195° rotation (FIGURES 8 and 9), release breakers 39 reclose preparatory to the next cycle.

After a punching operation, when the pawls 69 are disengaged as a result of the movement of the actuator arms 62 back to normal position, the bell crank return springs 87 pull the punches 89 out of the tape being perforated. The pull out is assured by the bell crank limit bar 67 which, while the actuator arms are moving clockwise to the normal position shown, engages the downwardly depending arms of the bell cranks 82 thereby forcing any bell cranks not returned by the springs 87 to rotate counterclockwise to their normal positions.

Figure 5:
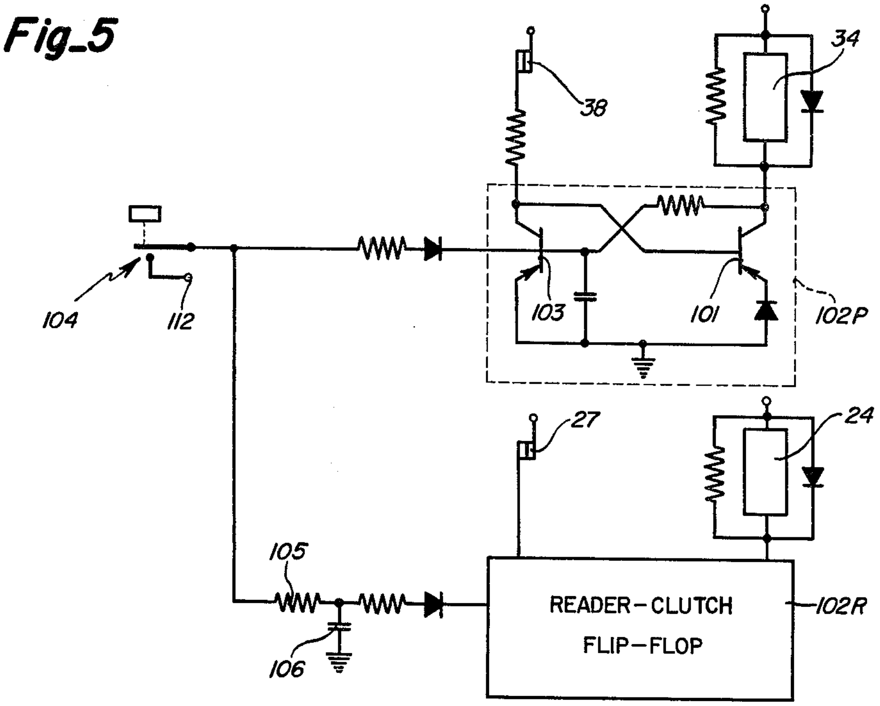
FIGURE 5 is a schematic diagram of the reader and punch clutch control circuitry.

As shown in FIGURE 5, the punch clutch and reader clutch solenoid 34 and 24 respectively are each connected in the collector circuit of the normally nonconducting transistor 101 of transistor flip-flop circuits 102R and 102P. The collector circuits of the normally conducting flip-flop transistors 103 are connected to power via the normally closed punch clutch 38 and reader clutch release breakers 27, respectively. Upon closure of a push to latch-push to open code convert switch 104, start signals are applied to the base electrode of the normally conducting half 103 of the punch flip-flop, and to the base electrode of the normally conducting half of the reader flip-flop after a predetermined delay, as determined by a delay circuit comprising resistor 105 and capacitor 106. The start signals will cut the normally conducting halves 103 off thereby rendering the other halves 101 conductive and the solenoids 24 and 34 energized. This state will obtain until associated release breakers 38 and 27 open at which time normal operation will resume. Since however the code convert switch is latched, the normally conductive halves will, when the breakers reclose, switch back to nonconductive state and associated solenoids will be re-energized.

Figure 6:
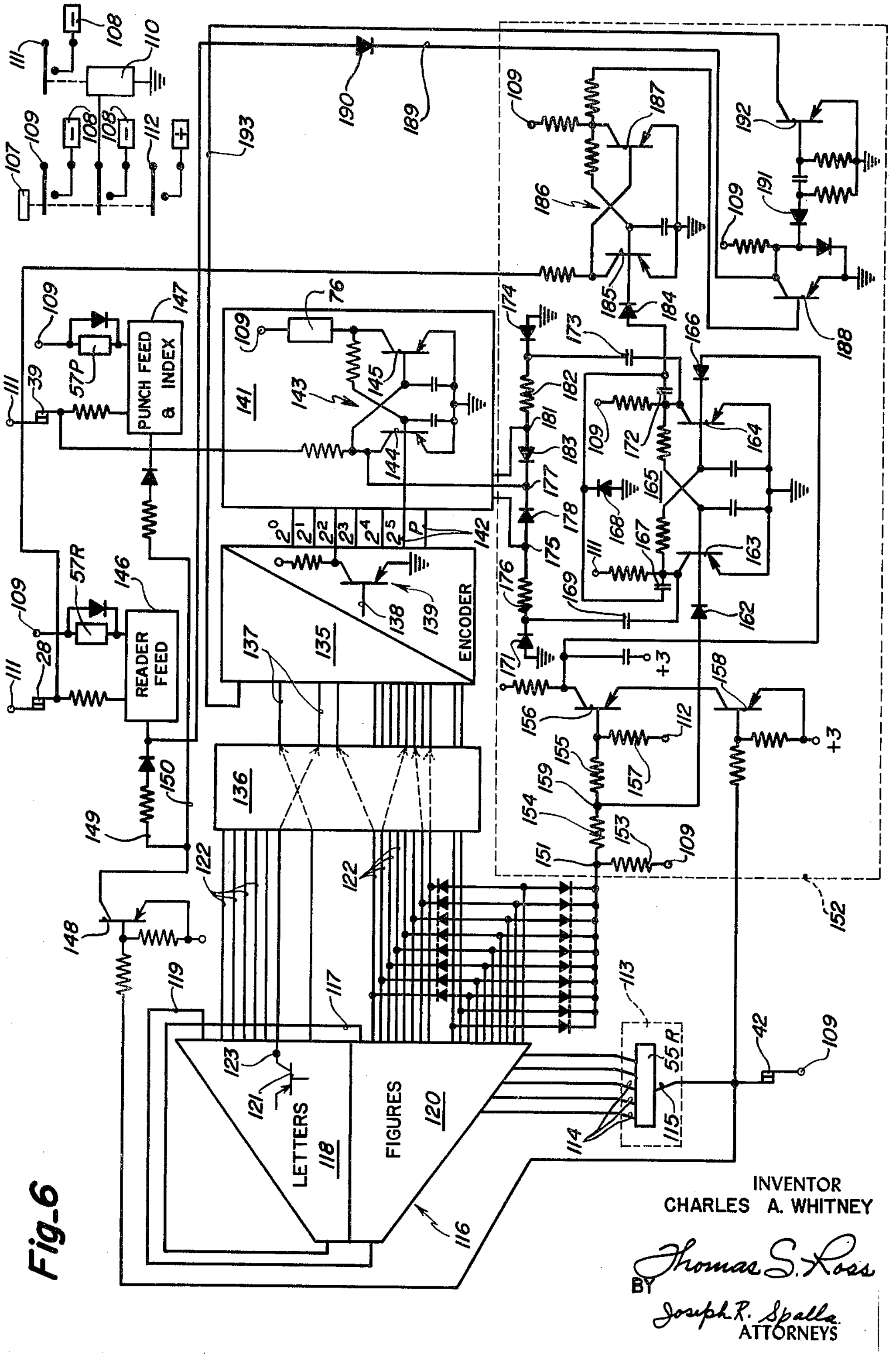
FIGURE 6 is a schematic diagram, some units being shown in block form, of a 5–6 level code conversion apparatus.

Referring now to the overall schematic diagram of a 5–6 converter as shown in FIGURE 6, power to the circuit elements is effected upon closure of a main power switch key 107 which connects a negative source 108 to a terminal 109 directly and across a relay 110 whose contacts, after a delay determined by the pull in time of the relay 110, connect the source 108 to a terminal 111. Switch 107 also connects a positive source to terminal 112. As will hereinafter appear, the delayed connection to terminal 111 is to assure that the proper halves of the flip-flops in the system are rendered conductive.

In FIGURE 6 a tape reading station 113 is shown which comprises the reader feed drum 55R associated with sensing brushes 114 and a common brush 115, the latter being connected through the regen breakers 42, to negative source terminal 109. As is understood a 5 level tape to be converted to 6 level tape will be threaded between the feed drum 55R and sensing brushes 114; brushes 114 making contact with the feed drum through perforations in the tape. The signals on the brushes 114 operate a matrix translator generally designated by reference numeral 116. When a "Letters" code is sensed and translated an output signal is developed on translator output line 117 which enables the "Letters" half 118 of the translator. When a "Figures" shift code is sensed and translated an output signal is developed on line 119 emanating from the "Letters" half of the translator and is operative to enable the "Figures" half 120 of the translator.

Figure 7:
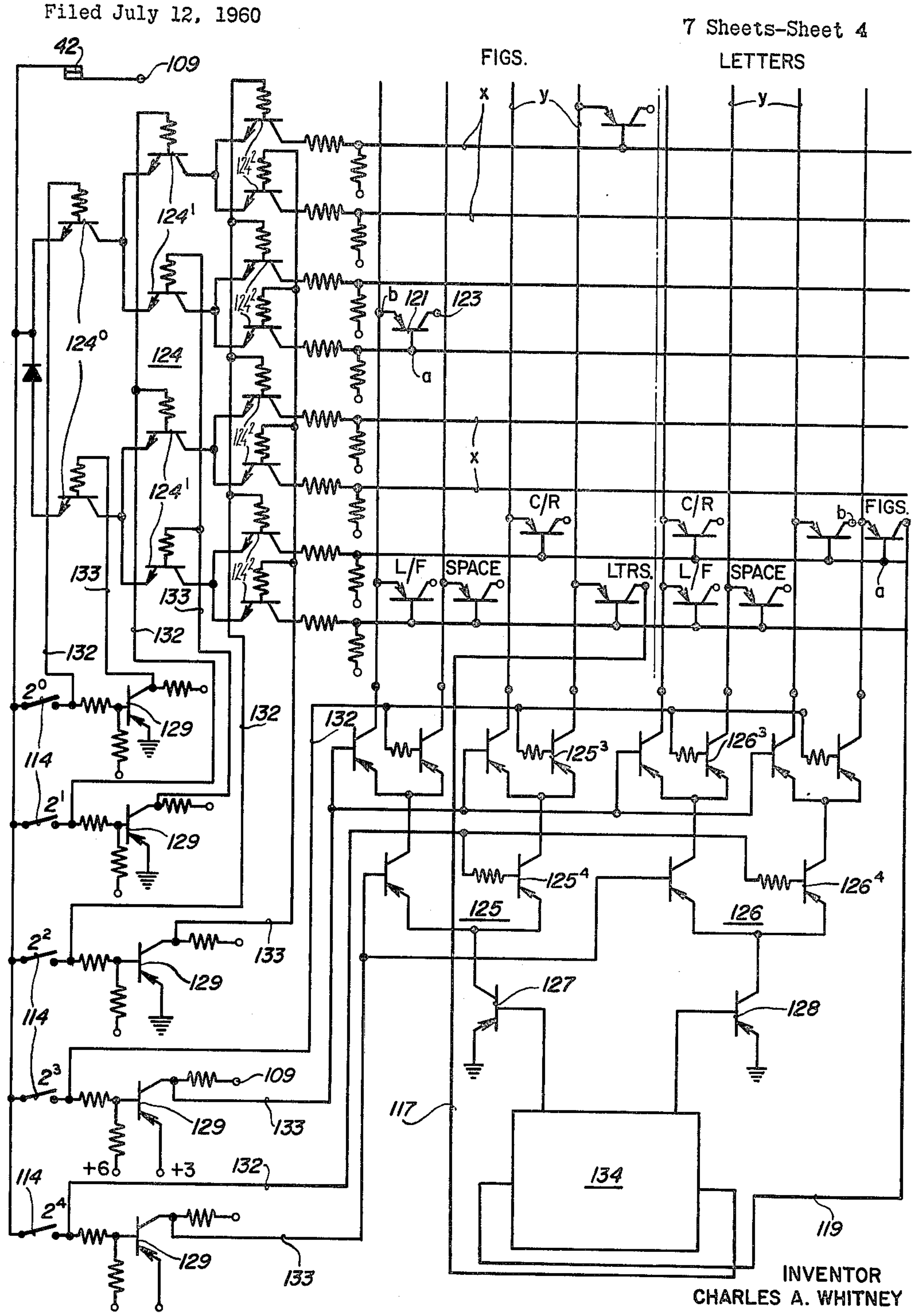
FIGURE 7 is a schematic diagram of a matrix level translator such as is employed in FIGURE 6.

The translator 116, more particularly shown in FIGURE 7, comprises an 8 x 8 conductor matrix having a first group of eight parallel conductors generally designated by reference character *x*, orthogonally disposed with respect to a second group of eight parallel conductors generally designated by reference character *y*. In accordance with the invention the *x* and *y* conductors are preferably deposited on opposite sides respectively of a dielectric board in accordance with well known printed circuit techniques whereby they are electrically insulated from one another. As seen in FIGURE 7 transistor load elements 121, only exemplary ones being shown, have their base and emitter terminals connected between the *x* and *y* conductors as at points *a* and *b*, whereby as is apparent, up to 64 load elements may be accommodated. Translator output lines 122 (FIGURE 6), all of which are not shown, are connected to the collectors 123 of transistors 121.

In accordance with the invention the *x* matrix conductors are connected to the eight outputs of a three level NPN transistor switching tree generally designated by reference character 124. Half of the *y* matrix conductors are connected to the outputs of a two level PNP transistor switching tree generally designated by reference numeral 125. Trees 124 and 125 together constitute the "Figures" half of the translator of FIGURE 6. The other half of the *y* conductors are connected to the four outputs of another two level switching tree generally designated by reference numeral 126, which together with tree 124 constitutes the "Letters" half of the translator of FIGURE 6. As illustrated, NPN tree 124 is operative in response to the $2^0$, $2^1$, and $2^2$ code level signals and is constituted by 1, 2 and 4 pairs of transistors $124^0$, $124^1$ and $124^2$ respectively. Trees 125 and 126 are operative in response to $2^3$ and $2^4$ code level signals and are each constituted by 2 and 1 pairs of transistors $125^3$ and $125^4$ and $126^3$ and $126^4$ respectively.

In the PNP trees the emitter electrodes of the transistors $125^4$ and $126^4$, associated with the $2^4$ bit signals, are adapted to be connected to ground through gating transistors 127 and 128 whereby they will be biased in the forward direction depending on which of transistors 127 or 128 is gated. The collector electrodes of transistors $125^4$ and $126^4$ associated with the $2^4$ code level are connected respectively to the emitter electrodes of the pairs of transistors $125^3$ and $126^3$ in the level associated with $2^3$ code bits, whose collector electrodes are in turn each connected to the emitter of a load transistor 121 via an *y* matrix line.

In the NPN tree the emitter electrodes of the pair of transistors $124^0$ associated with the $2^0$ code bit are adapted to be connected to the negative source potential 109 via regen breakers 42 whereby they will be biased in the forward direction when the breakers close, while their collector electrodes are each connected respectively to the emitter electrodes of a pair of transistors $124^1$ in the $2^1$ level, whose collector electrodes are in turn each connected respectively to the emitter electrodes of a pair of transistors $124^2$ in the $2^2$ level.

The collector electrodes of the $2^2$ level transistors in the NPN tree are each connected to the base electrode of a load transistor 121 via the matrix conductors *x*.

As will be appreciated each pair of transistors in the trees is required to function in the manner of a form C switch. In order then that one transistor of a pair be conductive and the other nonconductive, signals read from a record are fed directly to the base electrodes of one of each pair of associated level transistors and to the base electrodes of the other one of each pair of associated level transistors through signal inverter PNP transistors 129 associated with each code level.

As seen in FIGURE 7 the signal inverters 129 comprise PNP transistors with their emitter and collector electrodes biased in the forward and reverse directions respectively. The code readout brushes 114 are connected to the bases of one of each pair of associated level transistors in trees 124, 125 and 126 directly via conductors 132 and to the bases of associated inverters 129 whose collector electrodes are connected to the others of said pairs of associated level transistors in trees 124, 125 and 126 via conductors 133. Since a PNP transistor will conduct appreciably only when its base electrode is negative with respect to its emitter electrode and an NPN transistor will conduct appreciably only when its base electrode is positive with respect to its emitter electrode it is apparent that one or the other of said pairs of transistors 124 and 125 or 124 and 126 in the switching trees will be conductive with the result that current will flow from ground through code selected emitter-collector paths in the PNP tree then conditioned by gate 127 or 128, through a selected one of the *y* matrix conductors, and through a selected load transistor 121 determined by code selected collector-emitter paths in the NPN tree 124.

A transistor flip-flop circuit 134 is provided to gate one or the other of transistors 127 or 128 thereby enabling the "Letters" or "Figures" tree 126 or 125 respectively. The flip-flop circuit 134 is controlled by signals representative of "Letters" and "Figures" shift codes translated by the "Figures" and "Letters" halves of the translator respectively.

Referring again to FIGURE 6 the translator output lines 122 are connected to any desired input of a six+parity level encoder 135 via the selectively connected input output conductors of a transfer board generally designated by reference 136.

While any encoder is suitable, an encoder such as is disclosed in principle in said copending application 780,090 was employed. Briefly it comprises an input output matrix wherein input lines 137 assigned to particular characters or functions are selectively connected by resistors to one or more of seven binary level output lines 138 as determined by the binary code representative of the character assignment of each input line 137. Output lines 138 are connected to the bases of PNP transistors 139, an exemplary one being shown.

The collectors of the seven output transistors in the encoder are connected to a punch buffer unit 141 via bit lines 142. The buffer unit comprises seven flip-flop circuits 143, one associated with each of the bit output lines 142. Each flip-flop circuit, only one of which is shown, comprises a pair of PNP transistors 144 and 145, respectively, having their collector base elements cross connected. The collector of transistor 144 is connected through the normally closed feed breakers 39 to power terminal 111 and the collector of transistor 145 is connected through punch selector solenoid 57P to the power terminal 109. Since the application of power to the terminal 111 is delayed transistor 144 will be normally conducting as will the left half of flip-flop 147; hence the feed 57P and punch selector solenoids 76 will normally be deenergized. More particularly the bit lines 142 are connected to the base of transistor 144 in its associated flip-flop whereby the flip-flop 143 will change state and energize solenoid 76 in response to a positive going bit signal on line 142. A return to normal occurs when release breakers 39 open which removes negative potential from the base of transistor 145.

The reader feed 57R and punch feed and index punch selector solenoids 57P are connected in the normally nonconducting halves of transistor flip-flops 146 and 147, respectively, similar to that shown in FIGURE 5. The state of these flip-flops is changed, whereby the solenoids 57R and 57P are energized, upon closure of the regen breakers 42 which apply a negative potential to the base of a PNP transistor 148 which, upon conduction, applies a positive signal to the normally conducting halves of the punch and reader flip-flops 146 and 147 via lines 149 and 150 cutting them off. The reader and punch flip-flops 146 and 147 return to normal upon the opening of associated breakers 28 and 39.

Those translator output lines 122 which carry signals representative of upper case characters in both systems are all connected to a common terminal 151 in a precedence code generating circuit, generally designated by reference 152. Terminal 151 is connected to negative source 109 through a resistor 153 and also connected through resistors 154 and 155 to the base of a transistor 156 and to positive source terminal 112 through a resistor 157. The values of resistors 153, 154, 155 and 157 and the source voltages are chosen such that the base of transistor 156 will normally be negative with respect to its emitter thereby to render transistor 156 conductive, if a second transistor 158 having its collector connected to the emitter of transistor 156 is conductive. As shown transistor 158 is normally biased off through connection of its base to a +3 volt source but is rendered conductive upon closure of the regen breakers 42. Hence transistors 156 and 158 constitute an "and" circuit which is normally gated during the period over which the regen breakers are closed; assuming that none of the lines connected to terminal 151 are energized.

The junction 159 between resistors 154 and 155, which is normally negative with respect to ground, is connected via a diode 162 poled to pass positive pulses to the base of a transistor 163 which is interconnected with a transistor 164 to form a bistable flip-flop 165. The collector of transistor 156 is connected through a diode 166 poled to pass positive pulses to the base of a transistor 164. Flip-flop transistor 163 will be conductive when the main power switch connects collector voltage to terminals 109 and 111. Flip-flop 165 is operative to inhibit selected buffer flip-flops 143, to inhibit switching of the reader tape feed flip-flop 146 and to generate a null signal, as will hereinafter appear, only when switching state. As shown in FIGURE 6 the collector of transistor 163 is connected to one side of a capacitor 167 whose other side is connected to the cathode of a diode 168 whose anode is at ground. The collector of transistor 163 is also connected through a parallel circuit to one side of a capacitor 169 whose other side is connected to the cathode of a diode 171 whose anode is grounded. The collector of transistor 164 is similarly connected by a capacitor 172 to the cathode of diode 168 and by a capacitor 173 to the cathode of a diode 174 whose anode is at ground. The cathode of diode 171 is connected to a junction 175 via a resistor 176 and to a common junction 177 via a diode 178 poled to pass positive pulses. The cathode of diode 174 is similarly connected to a junction 181 via a resistor 182 and to the common junction 177 via a diode 183 poled to pass positive pulses. Junctions 175, 177 and 181 are connected to the collectors of selected bit flip-flops 143 in the buffer unit 141, thereby to inhibit switching of those flip-flops by bit signals on encoder output lines 142 for reasons which will hereinafter appear.

The collectors of both flip-flop transistors 163 and 164 are also coupled through capacitors 167 and 172 via a diode 184 poled to pass positive pulses to the base of a transistor 185 comprising the normally conducting half of a reader tape feed inhibit flip-flop circuit 186. The collector of transistor 187 comprising the normally nonconducting half is connected to the base of a normally conducting PNP transistor 188 whose collector is connected to the base of the normally conducting half of the reader feed flip-flop 146 via line 189 having a diode 190 connected therein poled to block the positive voltage of the collector 188 from switching flip-flop 146. The collector of transistor 185 is connected as shown to the reader feed release breakers 28 to assure conduction of transistor 185 and to permit restoration of flip-flop 186 when the breakers open. The collector of transistor 188 is also connected via a diode 191 poled to pass negative pulses to the base of a null signal generating transistor 192 whose collector is connected to the null input line 193 of the encoder 135.

With tapes in the reader and perforating units and with power turned on, all of the flips-flops will be in a normal state, the clutch release breakers 27 and 38 and the feed release breakers 28 and 39 being closed. Depression of the push to latch push to open code convert switch 104 will cause the punch clutch flip-flop 102P to switch state thereby energizing the punch clutch solenoid 34 at time $t_0$ (FIGURE 8) and the reader clutch solenoid 24 at a later time $t_1$, the time lag being such as to permit 180° punch cam shaft rotation before the reader cam shaft cycle is initiated at time $t_2$. As will be seen from the timing diagrams of FIGURES 8 and 9 the clutch release breakers, both reader and punch, which open at 15° in their respective cycles, reclose at 180° and since the code convert switch is latched closed, the clutch flip-flops effect the re-energization of their respective solenoids whereby subsequent cycles follow immediately after the initial cycle. As is apparent then, the cam shafts are in effect thereafter continuously rotated 180° out of phase.

Also with power on, precedence flip-flop 165 will be normal; diode 162 isolating negative junction 159 from the base of normally conductive transistor 163 and diode 166 isolating the negative potential at the collector of transistor 156 from the base of transistor 164. When the regen breakers 42 close, the "and" gate comprising transistors 156 and 158 will conduct, assuming the output lines connected to terminal 151 are not energized, thereby rendering the collector of transistor 156 positive. This positive pulse however is ineffective on transistor 164 which is already cut off. Hence the state of flip-flop 165 will remain normal until such time that junction 159 goes positive in response to a signal generated on one of translator output lines connected to terminal 151 as a result of the closure of the regen breakers.

In that 5 level tapes usually start with perforations representative of machine functions such as carriage return, line feed and then a precedence code, the machine functions i.e. carriage return, line feed and space are assigned an output in both the "Letters" and "Figures" half of the translator as shown in FIGURE 7. This expedient makes the state of the translator flip-flop 134 immaterial. Hence assuming that the left half of the flip-flop 134 becomes conductive when power is turned on, its right half will render the base of gate transistor 128 negative which will conduct enabling the letters half of the translator. Assuming then that the first code in the tape to be sensed is representative of a carriage return function, when the regen breakers 42 close at 200° in the punch cam shaft cycle as shown by curve 200 in initial punch cam shaft cycle, transistor 148 will conduct and the positive signal on lines 149 and 150 will cause flip-flops 146 and 147 to switch state, whereby both the reader feed solenoid 57R (current curve 201) and punch feed and index punch solenoids 57P (current curve 202) are energized. Simultaneously the carriage return perforation pattern is sensed and translated whereby the carriage return translator output line 122 emanating from the "Letters" half 118 of the translator is energized and the signal directed to the encoder input line 137 assigned to carriage return. Since no one of the translator lines which are representative of upper case characters in both systems is energized, the signal is encoded, and the encoder output lines energized switch associated buffer flip-flops 143 thereby setting up selected punch selector solenoids (also current curve 202). In that the punch feed mechanism feeds only in the 42°–180° interval and the punches can be selected only in the initial 180° punch drive cam cycle, no feeding or punching occurs in the initial punch cycle but the feed and punch selector solenoids remain energized into the next cycle; the opening of the regen breakers at 230° having no effect on flip-flops 146 or 147. Reader feed will be effected in the first reader cycle however because the reader feed solenoid is still energized when the feed drive arm 29 reaches its 180° position; tape feed occurring in the 222°–360° interval of the reader cam shaft as was hereinbefore explained. In the second punch cycle, the tape in the punch unit will be fed in the 42°–180° interval, which occurs simultaneously with the 222°–360° reader interval, and the tape in the punch unit will be perforated during the 187°–353° interval of the punch cam shaft. As shown by curve 204 the feed and punch flip-flops are restored by the opening and closing of respectively associated breakers over the 165°–195° intervals of associated shafts. In the second punch cycle the regen breakers reclose thereby to read another code e.g. a "Figures" precedence code, from the tape in the reader.

Since it was assumed that the translator flip-flop was in a state such that the "Letters" half was enabled, the output line 119 representative of the "Figures" code will be energized which, as shown in FIGURES 6 and 7, is connected to the input of the left side of the translator flip-flop 134 thereby switching the flip-flop and gating the transistor 127 associated with the "Figures" half of the translator. As before, the tape in the reader will be fed over the 222°–360° interval in the second reader cycle as will the tape in the perforating unit in the third punch cycle over the simultaneously occurring 42°–180° interval in response to closure of regen breakers. In the third punch cycle none of the encoder outputs having been energized as a result of the translation of a "Figures" code, a feed hole only will be perforated. In the third punch cycle the closure of the regen breakers will read the third code pattern in the tape in the reader. If the third code pattern represents a lower case character in the system employing the 6 level code, e.g. a numeral, its transistor output line having no connection to terminal 151, the reader tape will feed in the third cycle and perforation of the code representative of the character sensed will be accomplished in the punch tape as before. The above sequence will continue with no effect on the precedence circuitry until a code pattern representative of an upper case character in the system employing the 6 level code is sensed because the "and" circuit will be gated upon each closure of the regen breakers when characters, whether lower or upper case in the system employing the 5 level code are all lower case in the system employing the 6 level code. If however, the third code pattern read and translated is one which is upper case in the system employing the 6 level code, e.g. the character $, a signal will be developed on one of translator output lines 122 connected to terminal 151. These lines are also connected through to the encoder but the bits representative of the discrete signal on the selected line 122 will be overriden as will hereinafter appear as a result of the simultaneous generation of a signal on the encoder null input line 193. More particularly a signal on terminal 151 will render junction 159 positive thereby cutting transistor 156 in the "and" circuit off. The negative pulse on the collector of transistor 156 is ineffective on transistor 164 due to diode 166. The positive potential at junction 159 however will be passed by diode 162 to cut transistor 163 off causing 164 to conduct and capacitors 172 and 173 to discharge. The discharge of capacitor 173 will develop positive pulses at junctions 181 and 177 thereby to inhibit selected buffers flip-flop 143. The discharge of capacitor 172 passes a positive pulse to the base of transistor 185 of flip-flop 186, cutting it off, which in turn renders transistor 187 conductive. The positive pulse developed at the collector of transistor 187 cuts transistor 188 off. The negative pulse developed at the collector of 188 is applied via line 189 to the base of the normally conducting transistor of the reader flip-flop 146. The positive signal developed at the collector of transistor 148 as a result of closure of regen breakers will have switched the reader flip-flop 146 but the negative pulse on line 189 will switch it back to normal thereby de-energizing the tape feed solenoid 57R as shown in the third reader cycle (FIGURE 9) before the reader feed eccentric moves the armature of the feed solenoid to the position (180°) where it is adjacent the solenoid pole piece. Hence the armature will not be restrained and no reader tape feed in the third reader cycle will occur. The punch feed and index flip-flop 147 however will be switched by the positive pulse from transistor 148 thereby effecting tape feed in the fourth punch cycle as shown.

Figure 9:
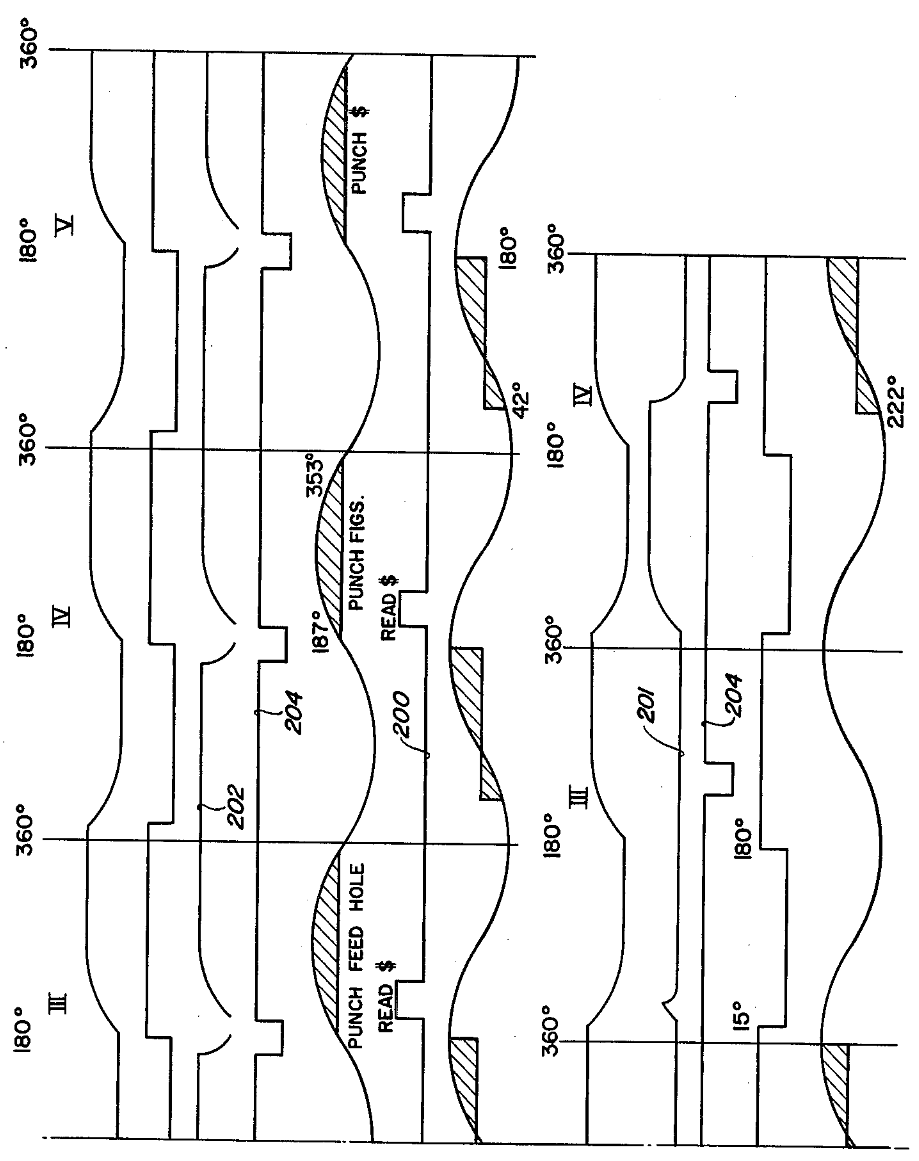

The negative pulse at the collector of 188 also renders transistor 192 conductive whereby a positive pulse is developed at the collector thereof to energize the encoder null input 193. This energizes all of the encoder output line 142. Those buffer flip-flop inhibited by the signals on junction 181 and 177, however, are not responsive to associated bit signals with the result that the array of punch solenoids energized is such as to perforate a 6 level "Figures" precedence code in the fourth punch cycle (FIGURE 9). In that reader feed was inhibited the same character will be sensed again upon closure of the regen breakers in the fourth punch cycle. Closure of the regen breakers will switch both feed flip-flop 146 and 147 to simultaneously effect reader feed in the fourth cycle and punch feed in the fifth cycle as before. The code pattern sensed in the fourth punch cycle will be translated, re-encoded and will set up the punch selector solenoids 76 to effect the perforation of the $ code pattern in the fifth punch cycle, the signal on terminal 151 this time being ineffective to switch flip-flop 165 since it is already in "Figures" state. This state of operation will maintain as long as code patterns representative of upper case characters in the system employing the 6 level code are sensed, since the "and" circuit will not be gated when the regen breakers close due to signal application to terminal 151.

The subsequent reading of a code pattern representative of a lower case character in the system employing the 6 level code will, however, develop a signal on a translator output line 122 other than one of output lines 122 connected to terminal 151 thereby permitting, since junction 159 will go negative, transistor 156 in the "and" circuit to conduct when the regen breakers close whereby a positive pulse will be applied to the base of flip-flop transistor 164, cutting it off. The switching of flip-flop 165 will inhibit the reader feed, generate a null signal and inhibit bit flip-flops 143 associated with junctions 175 and 177 rather than junctions 181 and 177, the latter due to the discharge of capacitor 169, thereby permitting the perforation of a 6 level "Letters" precedence code prior to perforation of the character code pattern as before.

Figure 10:
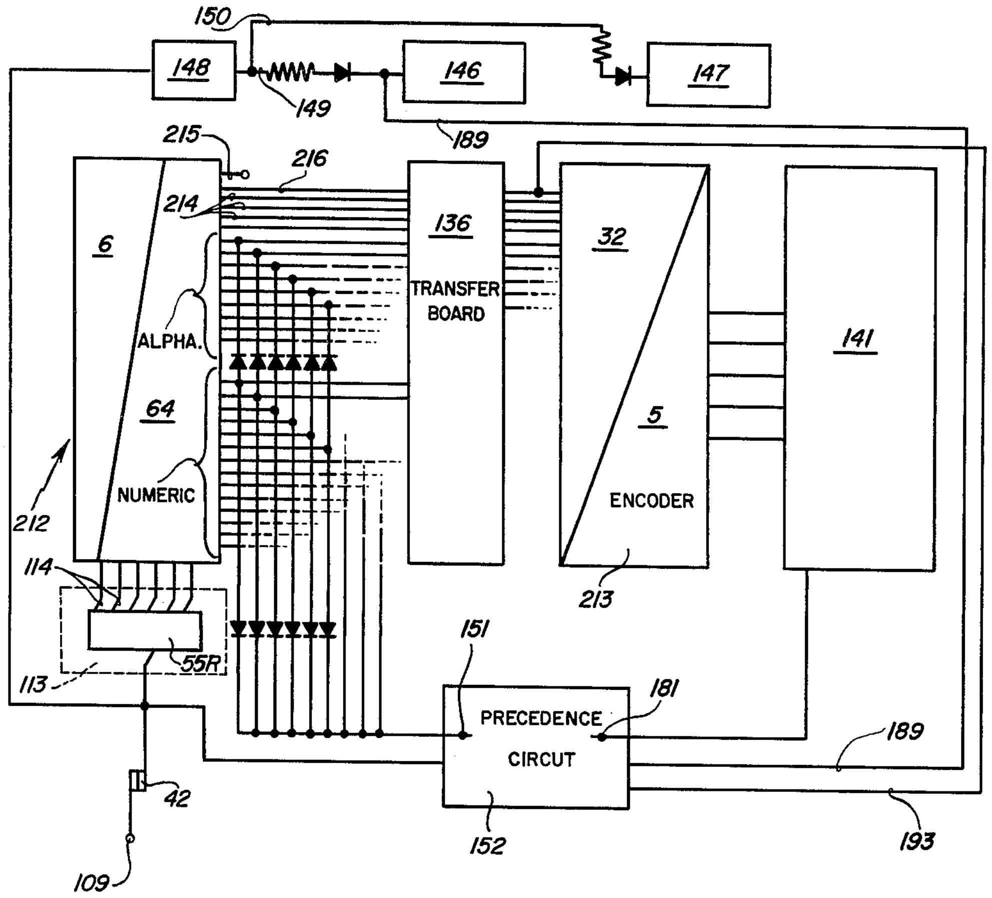
FIGURE 10 is a block schematic of a 6 to 5 level code converter.

If all of the characters of a system employing the 6 level code recorded in a tape have a corresponding character in a system employing the 5 level code, the above described 5–6 converter may be employed as a 6–5 converter with a minimum of changes. More particularly as shown in FIGURE 10 a straight 6 level translator 212 and a 5 level encoder 213 may be substituted for those employed in FIGURES 6 and 7. The A–Z or alpha lines of the 6 level translator 212 will be steered to the proper 5 level encoder inputs. Since numbers and symbols in a 5 level system are all upper case and are represented by the same code patterns which represent characters A–Z, the numerals and symbols or numeric output lines will therefore be connected to associated A–Z lines and also to terminal 151 in the precedence generating circuit. Machine functions i.e. space, carriage return and line feed will be steered to the proper encoder outputs via lines 214.

In the 6–5 converter the signal line 215 representative of an upper case code pattern will not be employed The signal corresponding to the translated lower case code ("Letters") will be steered over line 216 directly to the 5 level encoder to effect the perforation of a "Letters" code which is a null code pattern in a system employing the 5 level code. Any code pattern sensed representative of a character which is upper case in the system employing the 5 level code will operate the precedence circuit as hereinbefore explained to inhibit tape feed, generate a signal on the "Letters" input to override the character sensed and to inhibit buffer bits to form a "Figures" code. Inasmuch as only one bit need be inhibited to produce a "Figures" code i.e. in 5 level the "Figures" code differs from the "Letters" code by one bit, the lines connecting junctions 175 and 177 may be opened when converting from 6–5; only the line connecting junction 181 to a buffer flip-flop being necessary.

It should be understood that the foregoing disclosure relates to only a preferred embodiment of the invention and that it is intended to cover all changes and modifications of the example of the invention herein chosen for the purposes of the disclosure, which do not constitute departures from the spirit and scope of the invention.

The invention claimed is:

1. Apparatus for converting codes of a first system into codes of a second system comprising, means for reading a record containing codes in said first system, means for translating codes read by said reading means into discrete signals, means for moving said record after each code read, means for encoding said discrete signals into codes of said second system, means for recording said second system codes, and means responsive to the initial one of dicrete signals representative of information whose case in said second system differs from that of information last encoded for inhibiting said record moving means and for controlling said encoding and said recording means to produce a precedence code prior to the conversion of the last read information.

2. Apparatus for reconstituting 5 bit code patterns into 6 bit code patterns representative of the same data, said code patterns being recorded respectively on first and second records in columns transverse the direction of movement of said records, comprising means for sensing said first record to derive discrete electrical signals representative of 5 bit patterns sensed, encoding means for converting said discrete signals into 6 bit electrical code patterns, means for recording 6 bit code patterns, a plurality of control means responsive to said electrical code patterns for controlling said recording means, means for feeding said first and second record feed records, first and second control means for controlling said first and second record feeding means, means controlled by said recording means for cyclically generating a signal for controlling the operation of said sensing and said record feed control means, circuit means operable to detect discrete signals whose case differs from that of previously recorded signals, said encoder and said plurality of control means being responsive to the output of said circuit means to effect the recording of a precedence code in said second record, and means responsive to the output of said circuit means for rendering said first record feed control means unresponsive during the recording of said precedence code.

3. Apparatus as recited in claim 2 wherein said circuit means comprises an AND gate and a bistable circuit operable from its normal state to its other state and vice versa when said gate is initially blocked and unblocked respectively, means for applying said cyclically generated signals and said discrete signals whose case differs from that of previously recorded signals to said gate, said gate being unblocked when said cyclically generated signal only is applied to said gate, and means for deriving output pulses from said bistable circuit each time it switches state.

4. Apparatus for converting $n$ level to $m$ level binary codes employed respectively by first and second systems where both systems employ capacity doubling precedence codes preceding identical upper and lower case character codes and wherein the case assignments of particular characters differ from system to system comprising a cyclically operable reader including record indexing means, a cyclically operable recorder synchronously operable with said reader and including record indexing means, means operable by said cyclically operable recorder to effect the sensing of said $n$ level codes in one recorder cycle and for effecting the simultaneous indexing of the $n$ and $m$ level tapes in a subsequent cycle, means for translatting said $n$ level codes, means for encoding discrete translator output signals into $m$ level codes, bit selector means responsive to said $m$ level codes and operable to control said recorder and thereby effect the recording of said $m$ level codes, a bistable control circuit, means connecting those translator output lines representing upper case data in said $m$ level system to said bistable circuit whereby the presence of a signal on a translator output line representative of an upper case character in the $m$ level code will switch said bistable circuit to its other than normal state and whereby the absence of such a signal will cause said bistable circuit to switch back to its normal state, first means responsive to the switching of said bistable circuit for inhibiting the record indexing means in said reader and for generating a signal at the input of said encoder whereby encoder generated null code signals override the $m$ digit code signals representing the character sensed, and second means responsive to the switching of said bistable circuit for rendering selected bit signals of said null code ineffective on said bit selector means thereby to control said recorder whereby a precedence code is recorded prior to the recording of the differing case data code.

5. Apparatus for converting $n$ digit codes recorded in a first record to $m$ digit codes in a second record, said $n$ and $m$ digit codes employing capacity doubling precedence codes whereby identical codes may be representative of upper and lower case characters, $m$ digit code recording means having a feed-record cycle, $n$ digit code sensing means having a sense-feed cycle, means for cycling said code recording means and said code sensing means midway of the code recording means cycle, means operable during each cycle of said code recording means to effect the sensing of said $n$ digit record and the generation of a control signal thereby to effect the simultaneous feeding of both of said records in a subsequent cycle, means for translating sensed codes into discrete signals, means for encoding discrete signals into $m$ digit codes, said recording means being responsive to said encoder output thereby to record *m* digit codes in said second record, a control circuit normally gated in response to said control signals, means for blocking said control circuit in response to said control signal and a simultaneously applied signal representative of data whose case differs from that of previously recorded data, a bistable circuit operable from one of its stable states to the other in response to the transition of said control circuit from a gated to a blocked condition and vice versa, means for deriving output pulses from said bistable circuit each time it switches state, and means responsive to said output pulses for inhibiting the feed of said first record, said output pulses being operative on the encoding and recording means to effect the generation of a precedence code prior to the recording of the differing case data code.

6. Apparatus for converting *n* bit codes recorded in a first record into *m* bit codes representative of the same information on a second record, both of said codes employing capacity doubling precedence codes whereby identical codes may represent upper and lower case information and wherein case assignments differ between *n* and *m* bit codes, a cyclically operable reader including feed means, a cyclically operable recorder including feed means, means for initiating the operation of said recorder and the operation of said reader midway of the cycle of said recorder, means in said recorder operable to effect the reading of said first record and to initiate the simultaneous operation of said reader and recorder feed means, means for translating *n* digit codes read by said reader into a plurality of discrete signals representative of upper and lower case characters in said *n* digit code, means for generating *m* digit codes corresponding to each of said discrete signals, bit selector means responsive to bit signals of said *m* digit codes operable to effect the recording of said *m* digit codes subsequent to the feed movement of said second record, a bistable control circuit, means for connecting those discrete signals which are representative of upper case information in both codes to said bistable circuit thereby switching it to its other than normal state, said bistable circuit being operative back to its normal state in the absence of a discrete signal on one of those translator output lines representing information which is upper case in both codes, said encoder and said bit selector means being responsive to the switching of said bistable circuit to effect the recording to an *m* digit precedence code, and said first record feed means being responsive to the switching of said bistable circuit to inhibit the feeding of said first record whereby the same code may be read subsequent to the recordation of the *m* digit precedence code.

7. Apparatus for converting *n* digit codes employed by a first system into corresponding *m* digit codes employed by a second system, both said *n* and *m* digit codes including precedence codes to distinguish upper and lower case information and wherein upper and lower case information assignments differ between systems comprising, means for translating *n* digit codes into $2^m$ discrete signals representative of both upper and lower case information in said first system, encoding means responsive to said discrete signals representative of information for deriving *m* digit codes, means responsive to discrete signals representative of information for determining whether the case assignment of the information in the second system differs from the case assignment in the second system of the information whose representative *m* digit code was last derived thereby to generate signals operative on said encoding means to derive an *m* digit precedence code, and means responsive to a signal generated by said last named means for delaying the conversion of the *n* digit code responsible for the generation of the precedence code until after the generation of said precedence code.

References Cited by the Examiner

UNITED STATES PATENTS

| | | | |
|---|---|---|---|
| 2,853,698 | 9/58 | Nettleton et al. | 340—172.5 |
| 2,872,666 | 2/59 | Greenhalgh | 340—172.5 |
| 2,918,657 | 12/59 | Crampton et al. | 340—172.5 |
| 2,919,429 | 12/59 | Hamilton et al. | 340—172.5 |
| 2,968,027 | 1/61 | McDonnell et al. | 340—172.5 |
| 3,008,127 | 11/61 | Block | 340—172.5 |

ROBERT C. BAILEY, *Primary Examiner.*

JOHN F. BURNS, MALCOLM A. MORRISON, *Examiners.*